United States Patent
Kegel et al.

(10) Patent No.: US 8,656,079 B2
(45) Date of Patent: Feb. 18, 2014

(54) METHOD AND APPARATUS FOR REMAPPING INTERRUPT TYPES

(75) Inventors: Andrew G. Kegel, Redmond, WA (US); Michael D. Vance, Sammamish, WA (US)

(73) Assignee: Advanced Micro Devices, Inc., Austin, TX (US)

( * ) Notice: Subject to any disclaimer, the term of this patent is extended or adjusted under 35 U.S.C. 154(b) by 132 days.

(21) Appl. No.: 13/330,244

(22) Filed: Dec. 19, 2011

(65) Prior Publication Data

US 2013/0159581 A1 Jun. 20, 2013

(51) Int. Cl.
*G06F 13/00* (2006.01)
*G06F 9/48* (2006.01)

(52) U.S. Cl.
USPC ........................................... 710/266; 710/260

(58) Field of Classification Search
USPC ........................................ 710/260–262, 266
See application file for complete search history.

(56) References Cited

U.S. PATENT DOCUMENTS

| 2002/0083258 A1* | 6/2002 | Bauman et al. ............... 710/311 |
| 2008/0114916 A1* | 5/2008 | Hummel et al. ............... 710/266 |
| 2010/0095085 A1* | 4/2010 | Hummel et al. ............... 711/207 |
| 2011/0197004 A1* | 8/2011 | Serebrin et al. ............... 710/267 |
| 2012/0054750 A1* | 3/2012 | Saripalli ....................... 718/100 |

* cited by examiner

*Primary Examiner* — Glenn A Auve
(74) *Attorney, Agent, or Firm* — Williams Morgan, P.C.

(57) ABSTRACT

A method and apparatus are provided for controlling system management interrupts is disclosed. The method comprises: receiving an interrupt signal; determining a type associated with the interrupt signal; using the determined type to access control information indicating an action to be applied to the determined type of interrupt; and blocking, passing or remapping the interrupt signal in response to the control information. The apparatus comprises a memory, an interrupt unit and a logic circuit. The memory is adapted to store control information regarding a plurality of types of interrupt signals. The interrupt unit is adapted to receive the interrupt signal, and use the interrupt type contained in the interrupt signal to access the control information stored in the memory. The logic circuit is adapted to block, pass or remap said interrupt signal in response to the control information.

16 Claims, 5 Drawing Sheets

METHOD AND APPARATUS FOR REMAPPING INTERRUPT TYPES

CROSS-REFERENCE TO RELATED APPLICATIONS

Not applicable.

BACKGROUND

The disclosed subject matter relates generally to interrupts and, more particularly, to controllably remapping selected interrupts.

Typical computer systems are generally comprised of a processor, memory and external or peripheral devices. Ordinarily, the processor is busy executing instructions retrieved from memory that are associated with an operating system and one or more application programs, such as a word processor, a graphics program, a game, or the like. However, execution of these application programs may be temporarily suspended to handle more urgent matters. For example, in some computer systems, the peripheral devices are configured to generate interrupt signals that are associated with a high priority concern, such as a hardware error, low-voltage or power-loss situation, a high-temperature situation, or the like. Owing to the urgency of this type of message, the processor promptly discontinues execution of the application program and begins to execute an interrupt handling routine that identifies a course of action to be taken by the processor in response to the particular type of interrupt.

Those skilled in the art will appreciate that if one or more of the peripheral devices generates a significant number of interrupts, the operation of the processor may be substantially engaged in executing the numerous interrupt handling routines, rather than executing the application programs. Such a condition may appear to the user as a slow and unresponsive application program.

In some instances one or more peripheral devices may fail or otherwise begin to operate in an undesirable fashion in which numerous interrupts are generated. In other instances, an attack may occur in which the security of one or more peripheral devices may be compromised and put into a mode of operation in which a rapid sequence of interrupts are generated to intentionally slow or substantially freeze the operation of the processor with respect to the application programs.

Interrupt messages are defined by the PCI-SIG PCI Express (PCIe) specification and the HyperTransport® specification as being in the form of a posted-write to a specific system address. There are several types of interrupts that are encoded in to a 3-bit field called the Delivery Mode field for PCIe MSI and Message Type (MT) field for the HyperTransport® protocol. Interrupt types are defined for: fixed, Lowest Priority (LPr), system management interrupt (SMI), non-maskable interrupt (NMI), initialization interrupt (INIT), startup interrupt (Startup), external interrupt (ExtInt), and APIC EOI (end-of-interrupt). By definition, a peripheral device should not issue a Startup or an APIC EOI, and thus, these two types of interrupts are considered "reserved" when defining the types of interrupt messages that peripherals can generate. Each peripheral is programmed by BIOS and system software (hypervisor or operating system) with information necessary to generate correct interrupts. The specifications and implementations, however, do not restrict peripherals from forming any type of interrupt, including these reserved interrupts.

Message-signaled interrupts (which includes all interrupt message types listed above) can be generated either by interrupt hardware on the peripheral or by memory accesses. An MSI is simply a posted-write to a special system memory address that is defined in the PCIe and HT specifications. Therefore, a malicious or defective hardware or software (device/device driver) could cause a peripheral to attempt a "DMA operation" to the special memory addresses and cause an interrupt storm, or cause the peripheral interrupt registers to contain detrimental interrupt values. This could lead to denial-of service as the processor spends excessive time handling spurious interrupts, especially in the case of falsely generated SMI requests.

Some systems, such as a virtualized system, allow a peripheral to be directly mapped (made directly accessible) to a guest Virtual Machine (VM). Thus, a guest VM can cause an interrupt storm that denies service to other guest VMs on the system, magnifying the impact of the attack.

Some systems contain control bits that allow system software to pass or block some of the interrupt types, but not all. In particular, SMI and the two reserved MT interrupts have no corresponding pass/block control mechanism. This means that interrupt storms caused by rogue guest VM device drivers are a threat because there is no hardware mechanism to throttle or stop the incoming interrupts. If an interrupt storm is created by a peripheral, the computing capacity of the system can be completely consumed processing the spurious interrupts, preventing forward progress on the primary computation duties of the system.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method that comprises: receiving an interrupt signal; determining a type associated with the interrupt signal; using the determined type to access control information indicating an action to be applied to the determined type of interrupt; and blocking, passing or remapping the interrupt signal in response to the control information.

Another aspect of the disclosed subject matter is seen in an apparatus for controlling interrupt signals. The apparatus comprises a memory, an interrupt unit and a logic circuit. The memory is adapted to store control information regarding a plurality of types of interrupt signals. The interrupt unit is adapted to receive the interrupt signal, and use the interrupt type contained in the interrupt signal to access the control information stored in the memory. The logic circuit is adapted to block, pass or remap said interrupt signal in response to the control information.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
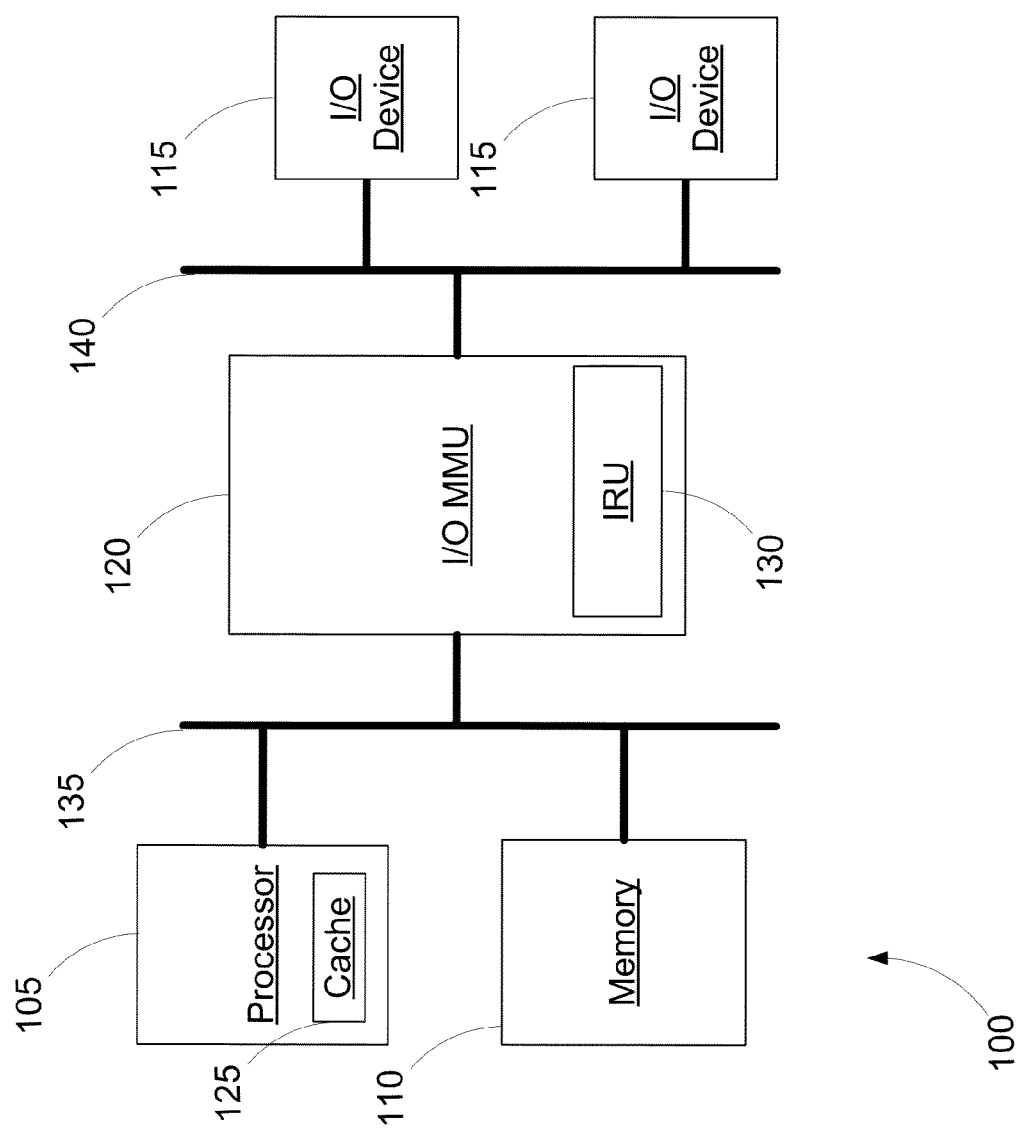
FIG. 1 is a block level diagram of a computer system, including a processor interfaced with a plurality of external devices through an I/O MMU.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 that generally includes one or more processors 105 (each comprising one or more processor cores) coupled with an external memory 110 and a plurality of I/O devices 115 through an I/O MMU 120. Those skilled in the art will recognize that a computer system may be constructed from these and other components. However, to avoid obfuscating the embodiments described herein, only those components useful to an understanding of the present embodiment are included.

Generally, the computer system 100 is capable of executing instructions associated with an operating system (not shown), an application program (not shown), and an interrupt handling routine (not shown). Ordinarily, the processor 105 executes instructions that it retrieves from the memory 110 and one or more caches 125 while performing operations associated with the application programs and the operating system. Occasionally, the processor 125 will receive interrupt signals that are of a higher priority than the application programs. These high-priority interrupt signals cause the processor 105 to suspend execution of at least the application programs in favor of the interrupt handling routine.

Input/Output (I/O) devices 115, which may comprise, video cards, sound cards, TV tuners, USB interfaces, and the like, may be configured to generate interrupt signals. There are several types of recognized interrupt signals, such as fixed, Lowest Priority (LPr), system management interrupt (SMI), non-maskable interrupt (NMI), initialization interrupt (INIT), startup interrupt (Startup), external interrupt (ExtInt), and APIC EOI (end-of-interrupt). The interrupt signals are delivered to an I/O Memory Management Unit (MMU) 120. In one embodiment, the I/O MMU 120 includes an interrupt remapping unit (IRU) 130 that receives the interrupts from the I/O devices 115 and is configured to examine each interrupt and take any of a variety of programmable actions. For example, the IRU 130 can be programmed to pass certain types of interrupts, to block certain types of interrupts or to reconfigure or remap certain types of interrupts.

Figure 2:
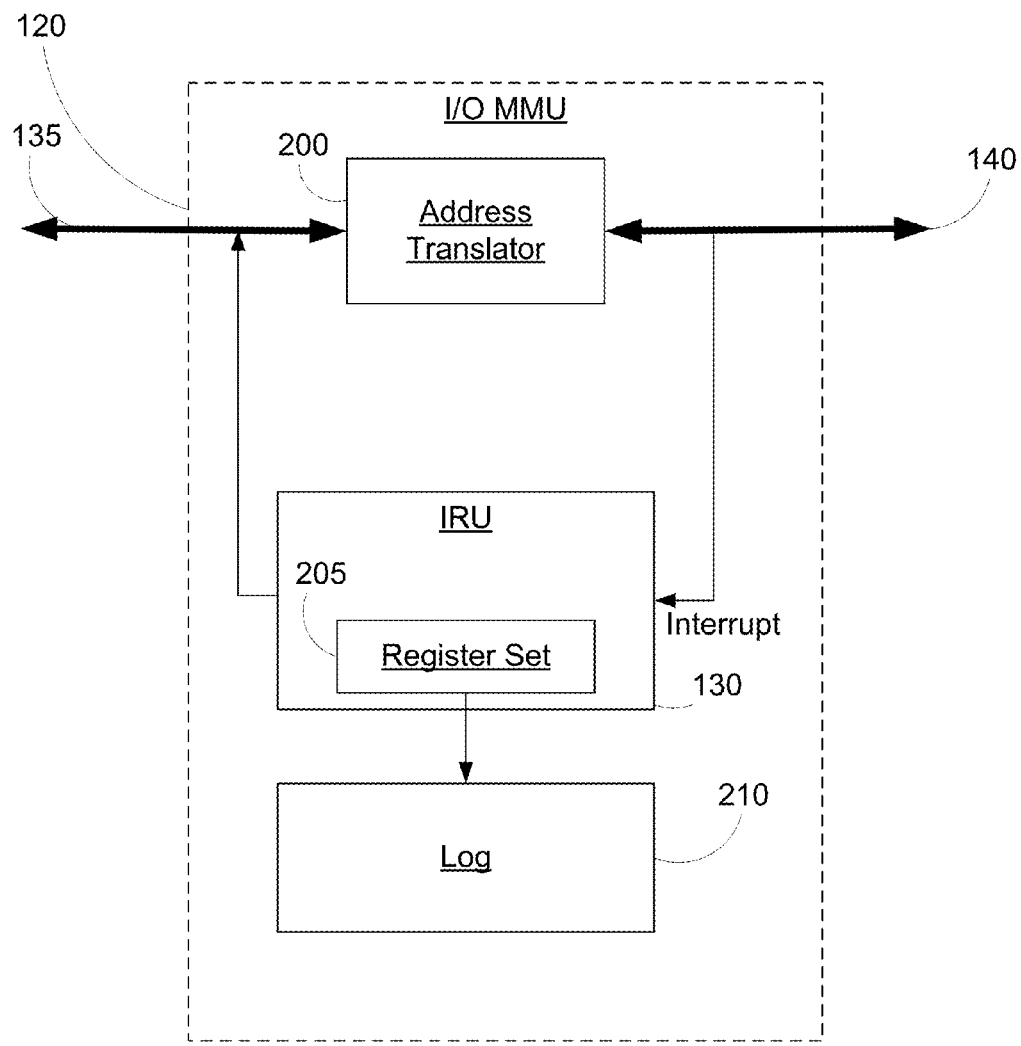
FIG. 2 is a block diagram of the I/O MMU of FIG. 1.

Turning now to FIG. 2, a block diagram representing one exemplary embodiment of the I/O MMU 120 is shown. Generally, the I/O MMU 120 is responsible for passing data, addressing, and control signals between the I/O devices 115 and various components of the computer system 100, such as the processor 105 and the memory 110 using a bus 135 and a bus 140, respectively. In one embodiment, the bus 140 may take the form of a PCIe bus. Further, in some applications, the I/O MMU 120 may include an address translator 200 that is responsible for performing address translations, such as memory address translations for memory operations initiated by the I/O devices 115, such as direct memory accesses (DMAs). Some of the signals received from the I/O devices 115 over the bus 140 are interrupts, which are delivered to the IRU 130 where they may be either, passed to the processor 105, blocked, or remapped.

In one embodiment, the IRU 130 includes one or more storage locations or register sets 205. Generally, the register set 205 contains control information that may be used to determine how a received interrupt should be treated. For example, in one embodiment, the register set 205 may contain an indication of which action is to be taken with respect to each interrupt type. That is, the register set 205 may include an indication as to which action (e.g., block, pass, or remap) should be taken for selected groups of interrupt types, or in some embodiments each individual interrupt type. Moreover, if remapping is selected, the "new" or "remapped" interrupt type for each remapped interrupt may also be stored in the register set 205.

In one embodiment, the register set 205 may be populated at boot time based on information available to the BIOS firmware or boot software, or the register set 205 may be populated by the hardware designer when the system 100 is designed. In some designs, the programming of the register set 205 may be fixed; in other designs, the programming of the register set 205 may be changed by OS software during runtime in order to allow dynamic changes to the remapping, blocking or passing functions for each interrupt type. For example, if too many interrupts are detected, indicating that the system may be experiencing an attack from a virus or other undesirable source, it may be useful to at least temporarily remap or block some of the interrupt types to reduce the effects of such an attack.

Additionally, in some embodiments, it may be useful to include a log 210 in the MMU 120, such that significant events occurring within the IRU 130 may be recorded and subsequently analyzed to determine various operating characteristics of the system. For example, by logging and analyzing the number and/or frequency of each type of interrupt being experienced, an attack, such as a Denial of Service (DoS) attack, may be detected. Further, by logging the number and/or frequency of interrupts generated by each peripheral device, it may be possible to identify problematic peripherals and to take actions to reduce their effect on the system. For example, problematic peripherals may be turned off, they may be prevented from generating interrupts, or they may be prevented from generating certain types of interrupts, at least for a preselected period of time. In this way, a peripheral device that has become infected by a virus or other undesirable software problem may be isolated to prevent the entire system from being comprised.

Figure 3:
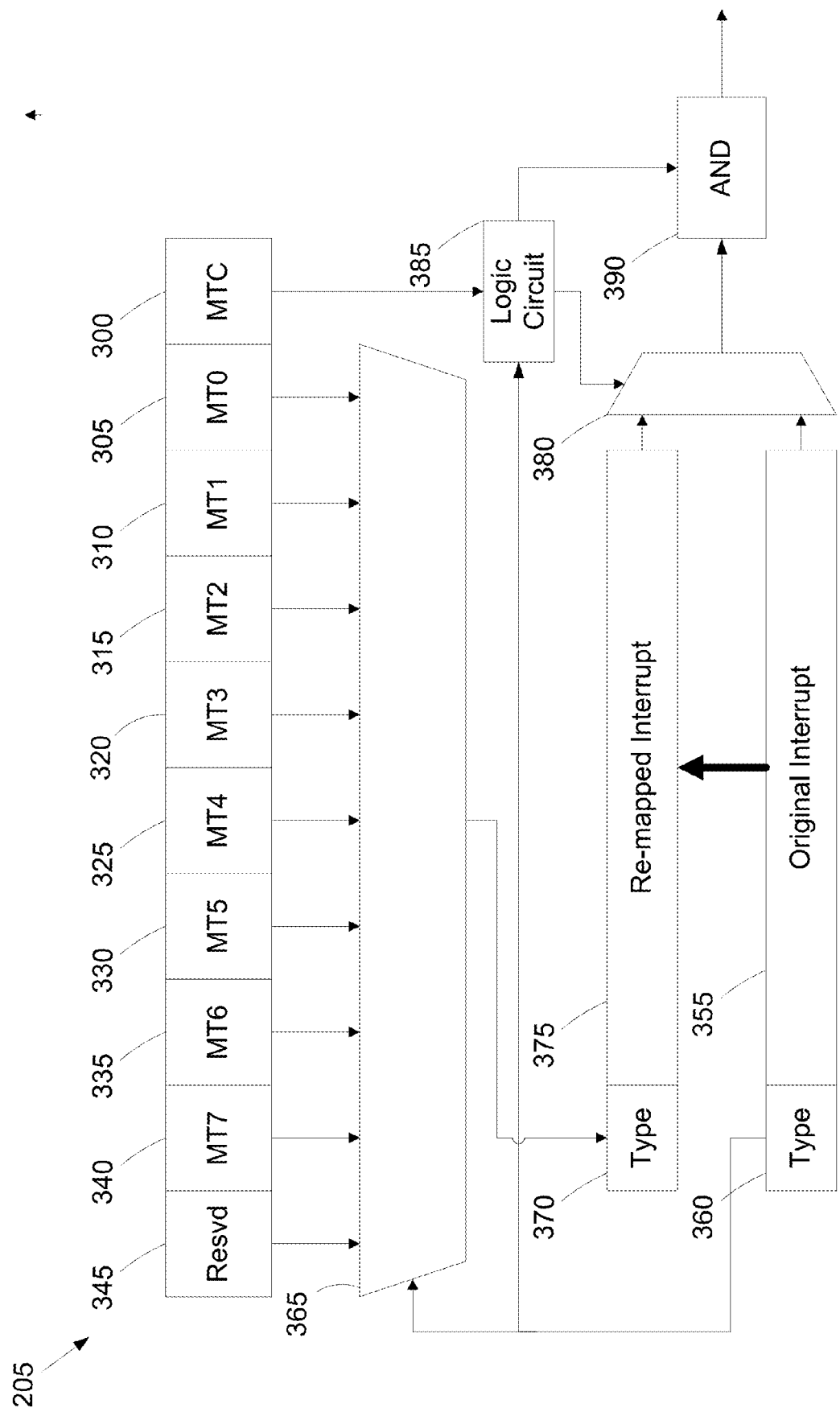
FIG. 3 is a block diagram of an interrupt register unit of the I/O MMU of FIGS. 1 and 2.

FIG. 3 illustrates one embodiment of the register set 205 and associated hardware for allowing interrupts to be blocked, passed or remapped. In one embodiment, the register set 205 includes a field (MTC) 300 that can be used to indicate an action (e.g., blocked, passed or remapped) to be applied to one or more interrupt types that are received by the MMU 120. The MTC field 300 is a control field that enables or disables the effects of the other fields in the register. In one embodiment, setting MTC to 00 may be defined to mean no mapping occurs. Another value of the MTC field 300 may be used to indicate that all interrupt message types are remapped. Additional values of the MTC field 300 may be used to define more subtle controls. In some embodiments, the MTC field 300 could be a single bit, but an implementation that reserves multiple bits (e.g., 3 bits) would leave room for future added functionality to control the handling of the interrupt and the recording and reporting of error conditions. For example, the system may implement an MTC field 300 that controls each interrupt type defining the action and recording/reporting behavior for all interrupt types.

The register set 205 also includes a plurality of fields 305-340 corresponding to each interrupt type (MT0-MT7). In one embodiment, for example, the field MT0 305 contains a 3-bit replacement value to be used when the I/O MMU 120 receives an interrupt coded with MT=0, the field MT1 310 would contain the 3-bit replacement value to be used when the MMU 120 received an interrupt coded with MT=1, the field MT2 315 would contain the 3-bit replacement value to be used when the MMU 120 received an interrupt coded with MT=2, and so on. In the current HyperTransport definition, MT=0 means fixed, MT=1 means lowest priority, MT=2 means SMI, MT=3 means NMI, MT=4 means INIT, MT=5 means Startup, MT=6 means ExtInt, and MT=7 means APIC EOI. Additionally, register set 205 also includes a reserved (Resvd) field 345, which may be used for future added functionality in conjunction with MTC 300.

When the I/O MMU 120 receives an interrupt from a peripheral, it is loaded into a register 355. A portion 360 of the interrupt identifies the type of interrupt (e.g., 0-7). The type 360 may be used as a control input to a multiplexer 365, which has a plurality of inputs coupled to the fields 305-350 of the register set 205. In this manner, the appropriate field 305-350 will be selected by the multiplexer 365 and loaded into a type portion 370 of a remapped interrupt register 375. The remaining portion of the remapped interrupt 375 is filled by a corresponding portion of the original interrupt 355. Thus, the remapped interrupt register 375 contains an interrupt that is identical to the original interrupt 355, except that its type 370 has been remapped based on information contained in the register set 205. For example, if an interrupt is received in the register 355 that has an interrupt type 6, then the multiplexer 365 will be instructed to select the MT6 field 335 and deliver it to the type portion 370 of the remapped interrupt register 375.

A multiplexer 380 may be used to select between the original interrupt in register 355 and the remapped interrupt in register 375. The value stored in the MTC field 300 may be used to control the multiplexer 380. For example, as discussed above, if the type portion 360 of the original interrupt indicates that the received interrupt is a type 6, then the portion of the MTC field 305 that indicates whether a type 6 interrupt should be remapped or passed may be selected by a logic circuit 385 and delivered to the multiplexer 380 to select either the original interrupt in register 355 or the remapped interrupt in register 375. In the event that the MTC field 300 indicates that the received interrupt type should be blocked, the logic circuit 385 may generate a block signal to an AND gate 390, which will prevent the interrupt, remapped or original, from being delivered to the interrupt handling routine of the processor 105.

The structure of the register set 205 allows any incoming interrupt message type to be remapped to any interrupt message type based on values stored in the MTC field 300 and the corresponding type fields 305-345 MT0-MT7. For example, an NMI interrupt (3) can be remapped to a fixed interrupt (0) by storing the value 000 in the MT3 field 320; an SMI interrupt (2) can be remapped to an NMI interrupt (3) by storing the value (011) in the MT2 field 315, and so on, as desired by the application. Note that this remapping applies to all interrupts received by I/O MMU 120 from any peripheral 215, as this embodiment does not implement a per-peripheral control. A broad range of implementations is envisioned. For example, a single MTC value may be used to control all Message Type behavior, such as block all interrupt types, pass all interrupt types, or remap all interrupt types. Alternatively, individual MTCs may be used to control each Message Type. For example, the MTC could be an eight-bit field, with one bit to control the remapping of each of MT0-MT7. This approach would provide a remapping granularity for each individual value of interrupt message type. In another implementation, there could be an MTC for each interrupt type that defines behaviors like "Pass and do not record in the Log 210," "Block and do not record in the Log 210," "Block and record in the Log 210," "Remap and record in the Log 210," "Pass and Canonical Reform" (preprogrammed values for all fields of the interrupt message), etc. Some interrupt formations may be considered system errors that will be logged and reported perhaps after a certain threshold so that system software can remedy the error source by, for example, disabling the interrupt source due to excessive error events. The remapping of the interrupt message may also implement mapping restriction enforced by hardware circuitry to prevent remapping to detrimental interrupt types or messages with inconsistent parameters e.g., trigger mode, etc. For example, the remapping of an incoming interrupt to SMI may be disallowed by hardware, or NMI may be restricted to a Fixed interrupt type with a pre-defined vector registered by system software, destination mode of zero, and a trigger mode of zero. Attempts to map outside of the range of allowed values will result in an error reported to the Log 210.

Figure 4:
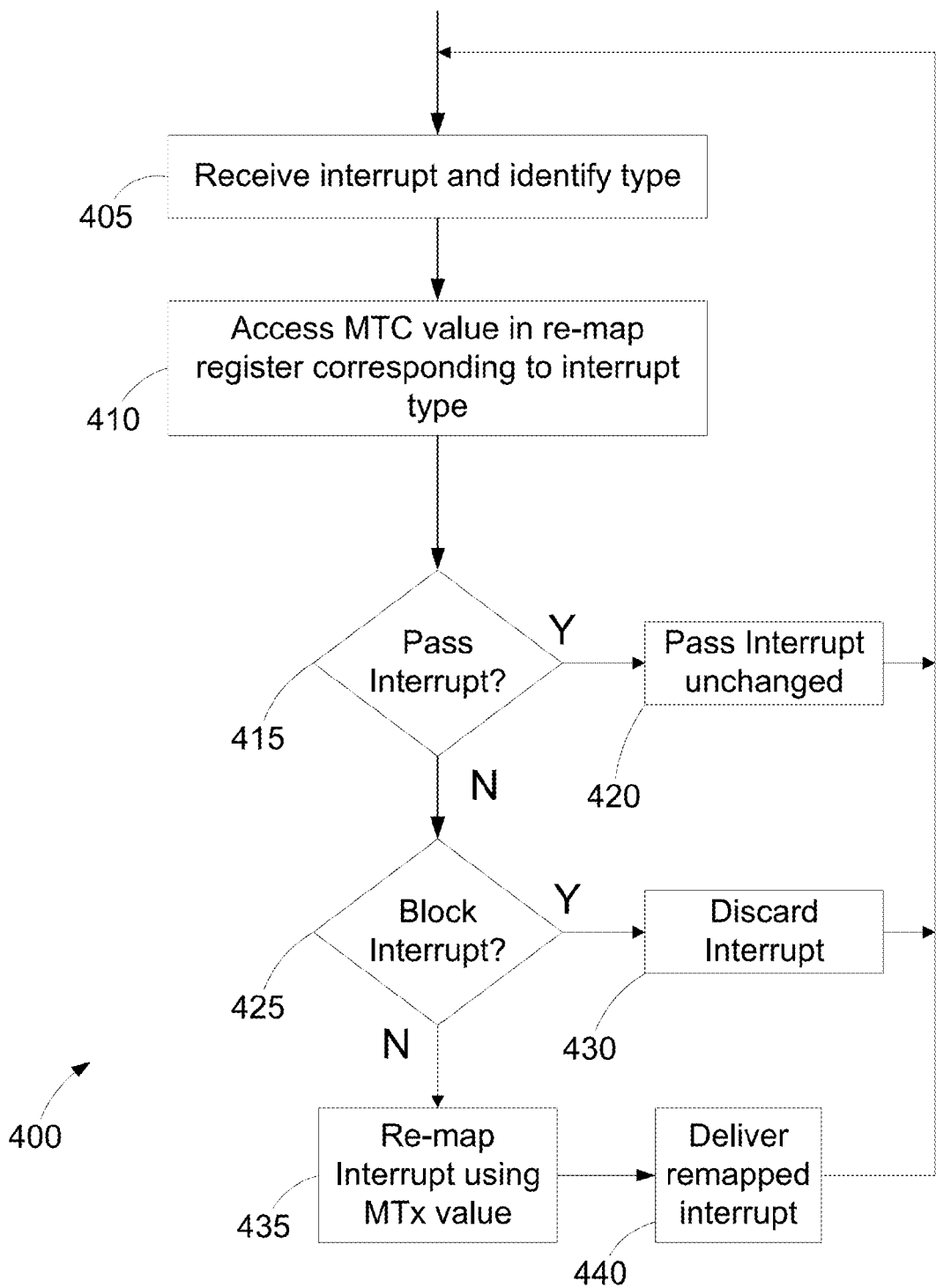
FIG. 4 is a flow chart illustrating a portion of the operation of the I/O MMU of FIGS. 1 and 2.

Turning now to FIG. 4, a flowchart describing an alternative embodiment of a method 400 for controlling the operation of the IRU 130 with respect to the register set 205 is shown. The process begins at block 405, with the IRU 130 receiving an interrupt from a particular I/O device 115. The interrupt includes information regarding the type of interrupt. The identification of the type of interrupt is obtained from the interrupt itself, and in block 410, the interrupt type is used to access the MTC value stored in the register set 205 that corresponds to the particular type of interrupt just received. In block 415, if it is determined from the MTC value that this particular type of interrupt should be passed without remapping, then control transfers to block 420, where the interrupt is passed or forwarded to the interrupt handling routine of the processor 105. If the MTC value does not indicate that the interrupt should be passed, then control transfers to block 425 and the MTC value is inspected to determine if the interrupt should be blocked. If blocking is required, control transfers to block 430 where the interrupt is blocked from being delivered to the interrupt handling routine of the processor 105, ignored, or otherwise discarded by the IRU 130. On the other hand, if the MTC value indicates that the interrupt type is to be remapped, then control transfers to block 435 where the value stored in the corresponding field 405-450 is used to replace the type field in the original interrupt and the now remapped interrupt is passed to the interrupt handling routine of the processor 105 in block 440.

Figure 5:
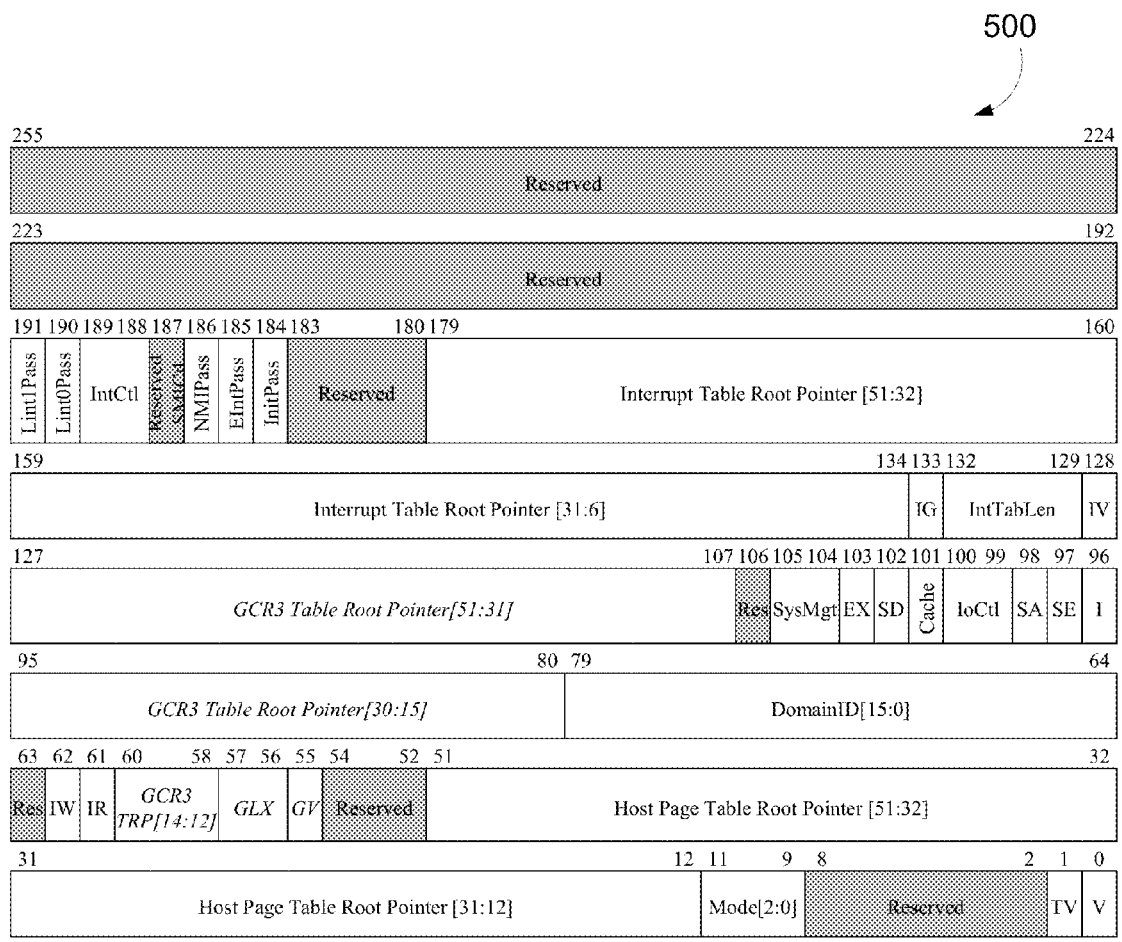
FIG. 5 is a stylized diagram of an alternative embodiment of a register set of FIG. 2.

Turning now to FIG. 5, an alternative embodiment of the register set 205 is shown. In this embodiment, control bits are defined in a per-peripheral control structure, such as a Device Table Entry 500. In this embodiment, the remapping may be different for different peripherals, which would offer more flexibility to software at the cost of more complexity and larger control tables. For example, the MTn and MTC values could be stored at locations 223-192 and may include information regarding passing, mapping, or blocking interrupt types for a particular peripheral or class of peripherals. That is, a first peripheral device may be allowed to pass a particular type of interrupt, whereas a second peripheral device may be blocked from delivering such an interrupt. Likewise, individual peripherals may have particular types of interrupts remapped to other types of interrupts. In this embodiment, one or more individual peripherals would have an MTC value associated with it, such that when an interrupt is received from a particular peripheral device, the sending device would be identified and the corresponding MTC would be selected from a known location in the Device Table Entry 500.

While the embodiments described herein have shown the functionality associated with remapping interrupts to be located within I/O MMU 120, those skilled in the art will appreciate that one or more of the functions associated with passing, blocking or remapping interrupt types may be accomplished in other components of the system 100. For example, the processor 105 may be used to execute one or more of these functions.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
   determining a type associated with an interrupt signal;
   using the determined type to access control information indicating an action to be applied to the determined type of interrupt; and
   blocking, passing or remapping the interrupt signal in response to the control information, wherein the control information is capable of being dynamically updated.

2. A method, as set forth in claim 1, wherein using the determined type to access control information indicating the action to be applied to the determined type of interrupt further comprises retrieving at least one value stored in a register set, wherein the value indicates that one or more interrupt types are to be blocked, passed or remapped.

3. A method, as set forth in claim 2, wherein retrieving at least one value stored in the register set, wherein the value indicates that one or more interrupt types are to be blocked, passed or remapped further comprises retrieving at least one value stored in the register set, wherein the value indicates that a plurality of interrupt types are to be blocked, passed or remapped.

4. A method, as set forth in claim 2, wherein retrieving at least one value stored in the register set, wherein the value indicates that one or more interrupt types are to be blocked, passed or remapped further comprises retrieving at least one value of a plurality of values stored in the register set, wherein each one of the plurality of values stored in the register set corresponds to one of a plurality of interrupt types, and each value indicates that the corresponding interrupt type is to be blocked, passed or remapped.

5. A method, as set forth in claim 1, wherein dynamically updating the control information further comprises dynamically updating the control information based on historical interrupt information.

6. A method, as set forth in claim 5, wherein dynamically updating the control information based on historical interrupt information further comprises dynamically updating the control information to block a first interrupt type in response to receiving more than a preselected number of the first interrupt type signals within a preselected period of time.

7. A method, as set forth in claim 1, wherein remapping the interrupt signal further comprises replacing the type of the interrupt signal with a new type to form a remapped interrupt signal.

8. A method, as set forth in claim 7, wherein replacing the type of the interrupt signal with the new type to form the remapped interrupt signal further comprises retrieving the new type from a storage location associated with the type of the interrupt signal.

9. An apparatus for controlling interrupt signals, comprising:
   a memory adapted to store control information regarding a plurality of types of interrupt signals;
   an interrupt unit adapted to use an interrupt type contained in an interrupt signal to access the control information stored in the memory;
   a logic circuit adapted to block, pass or remap said interrupt signal in response to the control information; and
   an interrupt handler adapted to dynamically update the control information.

10. An apparatus, as set forth in claim 9, wherein the interrupt handler is adapted to dynamically update the control information based on historical interrupt information associated with one or more of the interrupt types.

11. An apparatus, as set forth in claim 10, wherein the interrupt handler is adapted to dynamically update the control by adding information to block or remap an interrupt type signal based on receiving more than a preselected number of the interrupt type signals within a preselected period of time.

12. An apparatus, as set forth in claim 9, wherein the logic circuit is adapted to remap by replacing the type of the interrupt signal with a new type to form a remapped interrupt signal.

13. An apparatus, as set forth in claim 12, wherein the logic circuit is adapted to retrieve the new type from a storage location associated with the type of the interrupt signal.

14. An apparatus, as set forth in claim 9 wherein the logic circuit is adapted to retrieve at least one value stored in the memory, wherein the value indicates that one or more interrupt types are to be blocked, passed or remapped.

15. An apparatus, as set forth in claim 9 wherein the logic circuit is adapted to retrieve at least one value stored in the memory, wherein the value indicates that a plurality of interrupt types are to be blocked, passed, or remapped.

16. An apparatus, as set forth in claim 9 wherein the logic circuit is adapted to retrieve at least one value of a plurality of values stored in the register set, wherein each one of the plurality of values stored in the register set corresponds to one of a plurality of interrupt types, and each value indicates that the corresponding interrupt type is to be blocked, passed, or remapped.

* * * * *